United States Patent Office 3,492,255
Patented Jan. 27, 1970

1

3,492,255
NONCELLULAR RAPIDLY GELLED POLY-
URETHANE COMPOSITIONS
David S. Cobbledick, Amherst, N.Y., assignor to Allied
Chemical Corporation, New York, N.Y., a corporation
of New York
No Drawing. Filed July 7, 1966, Ser. No. 563,348
Int. Cl. C08g 22/40
U.S. Cl. 260—18
16 Claims

ABSTRACT OF THE DISCLOSURE

Production of storage stable polyol compositions comprising a mixture of an organic polyol, an organo-mercuric salt catalyst and a promoter compound of a copper, silver or cadmium compound, and optionally, an inert filler, said catalyst and promoter compound being dissolved in said organic polyol and being devoid of ionizable halogen, and use thereof in preparation of rapidly gelled noncellular polyurethane compositions by reaction with an organic isocyanate.

The present invention relates to new and useful urethane polymers and more particularly to noncellular polyurethanes. It is especially concerned with a novel rapidly gelled noncellular polyurethane composition prepared under ambient conditions of temperature and pressure. It relates also to novel intermediates therefor.

It is known to gel and cure liquid mixtures of organic polyisocyanates and organic polyols in the presence of a dissolved organo-mercuric salt catalyst. The reaction occurs under ambient conditions of temperature (circa 25 to 40° C.) and pressure to afford substantally completely reacted stable noncellular polyurethanes such as polyurethane elastomers which thereby can be produced in situ on cloth, leather, paper, plastics and ceramics without application of elevated temperatures or pressures.

While the aforesaid organo-mercury catalysts possess attractive features, e.g. of being inert to moisture and of discriminately catalyzing isocyanate-polyol reaction rather than the competing reaction of isocyanate and water, they are of relatively low activity requiring an excessively long time to gel the liquid reaction mass. Faster gelation heretofore has been achieved by increasing the concentration of organo-mercury compound in the reaction mixture or admixing a dissolved lead salt catalyst. Increasing the concentration of organo-mercury compound is not a practical solution of the problem in view of the costliness of these compounds and decreasing the concentration by adding a lead salt presents a still unsatisfactory alternative since the lead compounds are sensitive to water and acid. The polyol component containing catalyst is usually stored before mixing with the polyisocyanate and due to this sensitivity of lead, the presence of moisture or formation of acid during storage can result in the formation of elastomers having unpredictable cure times and final properties.

It is an object of the present invention to devise a novel rapidly gelled noncellular polyurethane composition prepared under ambient conditions of temperature and pressure.

It is another object of the invention to devise novel stable solutions capable of acting as intermediates for the said novel polyurethanes.

It is a further object of this invention to devise an economical method of preparation of rapidly gelled non-cellular polyurethanes whereby the amount of organo-mercury catalyst is decreased.

These and other objects and advantages wil be apparent from the following description of my invention.

2

I have discovered that the aforementioned disadvantages are overcome in a new rapidly gelled noncellular polyurethane product comprising the reaction product of a liquid mixture of an organic polyisocyanate and an organic polyol reacted with one another at at least ambient temperature and presure in the presence of an organomercuric salt catalyst promoted by a compound of a metal of the group copper, silver and cadmium, said catalyst and said promoter being dissolved in the reaction mixture and being devoid of ionizable halogen.

The present invention also includes new reaction intermediates for the polyurethane-forming reaction, e.g. the organic polyol reactant, which contain in solution the aforementioned organomercuric catalyst and metallic promoter.

A preferred embodiment of my invention is directed to the production of novel rapidly gelled noncellular polyurethane elastomers, and in particular to preparation of novel filled elastomeric sealants for ceramics, e.g. for clay sewage pipes.

It was surprising to discover according to the invention that the activity of organomercuric salts in catalyzing polyurethane gelation was promoted, e.g. by as much as 30% or more, by copper, cadmium and silver compounds since many known metallic catalysts for polyurethane formation such as organic carboxylic acid salts of zinc, manganese zirconium, cobalt and particularly of divalent tin do not promote the activity of organomercuric salt catalysts or even retard gelation of organomercuric salt-catalyzed polyurethane-forming mixtures as illustrated herein below. Unexpectedly, also, the copper, silver and cadmium additives of the invention are highly selective with respect to the organo-mercury catalyst since it was found that they do not promote the activity of non-organomercuric salt urethane catalysts, e.g. mercuric acetate even under those basic reaction conditions which are disclosed as favorable to rapid polyurethane gelation according to copending U.S. patent application, Ser. No. 400,558 filed Sept. 30, 1964, now U.S. Patent 3,395,108.

The novel polyurethanes of the invention are obtained by commingling, advantageously with agitation, an organic polyol, or mixture of organic polyols, and an organic polyisocyanate, or mixture of organic polyisocyanates, under at least ambient conditions of temperature and pressure in the presence of dissolved organo-mercury catalyst and promoter therefor employing reaction techniques conventional in the art. Preferably the mercury catalyst and catalyst promoter are charged to the reaction mixture as a solution in the polyol component. If convenient, urethane formation can be carried out in non-hydroxylic reaction solvent such as dioxane, toluene, aliphatic petroleum hydrocarbons or the like. In preparing filled polyurethane elastomers according to a particular preferred embodiment of the invention, the filler is charged to the reaction mass as a dispersion in the polyol.

The organo-mercuric salt catalysts contemplated by the present invention are compounds of divalent mercury which possess a direct bond between carbon, i.e. a carbon atom of an aliphatic or aromatic radical and the mercury, and which are devoid of ionizable salogen, for example of fluorine, chlorine or bromine bonded directly to metal. The present mercuric catalysts have in general excellent solubility in the urethane-forming reaction mass and in the polyol reaction component. Representative examples of suitable organomercuric salt catalysts include:

phenyl mercuric acetate
o, m, or p-chlorphenyl mercuric acetate
o, m, or p-bromophenyl mercuric acetate
phenyl mercuric propionate
o, m, or p-fluorophenyl mercuric acetate
chloromethyl mercuric chloracetate methyl mercuric decanoate
phenyl mercuric phenoxide
methyl mercuric benzoate
phenyl mercuric oleate
phenyl mercuric nitrate
2-acetoxymercuripyridine
p-tolyl mercuric acetate
phenyl mercuric butyrate
p-methoxyphenyl mercuric acetate
phenyl mercuric p-chlorobenzoate Mixtures of these and equivalent organo-mercuric salts can also be used. As may be evidenced from the above, organo-mercuric salt catalysts generally contemplated herein are organo-mercuric carboxylates.

Preferably an organo-mercuric salt in which an aromatic radical is bonded directly to mercury is used as catalyst. An especially good result is obtained using a phenyl or substituted-phenyl mercuric salt of an aliphatic or aromatic carboxylic acid such as phenyl mercuric propionate, p-chlorophenyl mercuric acetate, or phenyl mercuric p-chlorobenzoate.

The amount of organo-mercuric salt catalyst employed in preparing the novel polyurethane compositions of the invention can vary over a considerable range. Amounts as little as 0.01% based on the weight of the polyol reactant substantially accelerate the polyol-polyisocyanate reaction and amounts of 5% or more can be used. Preferably between about 0.1 and 2% of mercury compound based on the weight of the polyol component is used. The optimum amount of catalyst to be used will depend upon the particular catalyst, and catalyst promoter as well upon the particular reactants and reaction conditions employed.

As the catalyst promoter any organic or inorganic compound of copper, silver, or cadmium which is devoid of ionizable halogen and which is soluble in the urethane-forming reaction mixture can be used. In general suitable reaction mixture-soluble promoter compounds are those which have a solubility of at least 0.1 weight percent in either ethanol or dioxane at ambient temperatures. As representative examples of suitable promoter compounds the following are mentioned:

Copper compounds copper 8-hydroxy quinolinolate
cupric acetate
cupric naphthenate
cupric oleate
copper bis(dibenzoylmethane)
copper acetyl acetonate
copper bis(ethyl acetoacetate)
cupric nitrate
cupric borate
cupric chlorate
cupric perchlorate Silver compounds silver acetate
silver benzoate
silver nitrate
silver borate
silver pentachlorophenate
silver propionate Cadmium compounds cadmium diethyldithiocarbamate
cadmium octoate
cadmium acetate
cadmium acetylacetonate
cadmium nitrate Mixtures of these and equivalent copper, silver and cadmium compounds can also be used.

Preferably the promoter metal compound used is an organic carboxylic acid salt, e.g. an acetate, octate, oleate, naphthenate or the like. If desired, the promoter metal carboxylate may be charged in the form of a solution in a petroleum hydrocarbon, e.g. mineral spirits. Preferably I employ as catalyst promoters cadmium and copper compounds as these are relatively inexpensive. Cadmium compounds are especially preferred in view of their low cost and excellent performance.

The proportion of catalyst promoter employed can also vary over a wide range. An amount of catalyst promoter compound corresponding to as little as about 0.01% promoter metal based on the weight of the polyol reactant provides a substantial reduction in the time required to gel the liquid reaction mass and amounts of promoter compound corresponding to as much as 2% or more of the promoter metal based on the weight of the polyol are effective. Preferably the promoter is charged in amounts corresponding to about 0.050.7% and especially to about 0.2% promoter metal based on the weight of the polyol reactant. Generally use of the promoter according to the invention reduces the time required to gel the mercury-catalyzed reaction mass by as much as 30% or more.

In accordance with the invention I avoid use of organo-mercuric salts and promoters containing ionizable halogen, i.e., compounds having halogen bonded directly to mercury or to the promoter metal or containing organic radicals substituted with labile halogen, e.g., the carbonyl chloride radical. Promoter metal halides and compounds containing labile halogen substituents when dissolved in the polyol reactant apparently undergo reaction with the organomercuric salt to form an organomercuric salt containing a direct halogen to mercury bond which is a relatively ineffective catalyst for urethane formation under ambient conditions. In general, ionizable halogen-containing catalysts and promoters are compounds whose solutions in the polyol or in ethanol give a precipitate of silver halide within 30 to 60 seconds on treatment with 50 weight percent aqueous silver nitrate at 25–30° C.

Suitable organic polyols for preparing the novel noncellular polyurethanes of the invention include simple polyols such as ethylene glycol or glycerol as well as polymeric polyols such as polyester polyols and polyalkylene ether polyols. Preferably the organic polyol is a polyalkylene ether polyol having a molecular weight between about 130 and 4500. Such polyols correspond essentially to the formula:

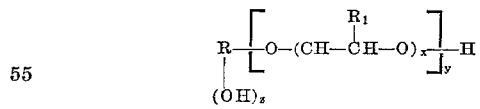

where R is the residue of a polyol as exemplified below, $R_1$ is hydrogen or methyl, $x$ is an integer from 1 to about 70, $y$ is an integer 1 to 6 and $z$ is an integer 0 to 5.

Such polyether polyols can be obtained in known manner by condensation of an alkylene oxide such as ethylene oxide, 1,2 propylene oxide, 1,3 propylene oxide or mixtures thereof with polyhydric alcohols such as ethylene glycol, propylene glycol, glycerol, trimethylol propane, 1,2,6-hexanetriol, pentaerythritol, α-methyl glucoside, sucrose or mixtures thereof in the presence of catalyst, such as trialkylamines, e.g. trimethylamine or inorganic bases, e.g., potassium hydroxide, or a metal halide e.g., boronitrifluoride. Polyether polyols which are derived from 1,2-propylene oxide and which are mixtures of either diols and triols or diols and tetrols are especially useful.

Typical suitable organic polyisocyanates for preparing the novel polyurethanes of the invention include:

Aliphatic polyisocyanates hexamethylene diisocyanate
pentamethylene diisocyanate Cycloaliphatic polyisocyanates cyclohexyl-2,4-diisocyanate
4,4'-methylene-bis(cyclohexyl isocyanate)

Aromatic polyisocyanates 2,4-toluene diisocyanate
2,6-toluene diisocyanate
4,4-methylene bis(phenylisocyanate)
1,5-naphthalene diisocyanate
4,4',4"-triphenylmethane triisocyanate
polyalkylene polyaryl polyisocyanates disclosed in U.S. Patent 2,683,730.

Urethane prepolymers, i.e. reaction products of an excess of a diisocyanate, such as any of those given above with an organic polyol such as trimethylol propane or polyalkylene ether polyols of the type mentioned above, as well as isocyanate polymers of diisocyanates can be used also in place of the polyisocyanates noted above. Preferably the organic polyisocyanate reactant is a urethane prepolymer.

The preferred urethane elastomers of the invention should contain a cross-linked structure. To produce such cross-linking, it is desirable to employ a polyol and/or polyisocyanate reactant of functionality greater than 2 and especially about 2.1 to 2.7.

The proportions of organic polyisocyanate and organic polyol employed in the polyurethane-forming reaction can be varied somewhat depending upon the particular characteristics of the non-cellular polyurethane product desired. In general a proportion of polyisocyanate and polyol sufficient to provide a ratio of isocyanato to hydroxyl groups of at least 0.9:1 should be used. In preparing urethane elastomers according to a preferred embodiment of the invention an amount corresponding to a ratio of NCO:OH of between about 1.0–1.4:1 is used.

In preparing filled elastomers according to a particular embodiment of the invention, the filler charged to the urethane-forming reaction mixture is a conventional finely divided material designated in this art as "inert." In preparing filled elastomers useful as sealants for sewer pipes and the like it is desirable that the fillers used be resistant to sewage and soil micro-organisms.

Typical examples of suitable fillers include:

| | |
|---|---|
| attapulgite | magnesium trisilicate |
| kaolin | zinc sulfide |
| talc | barium sulfate |
| bentonite | calcium fluoride |
| halloysite | titanium dioxide |
| aluminum silicate | amorphorus silica |
| calcium silicate | |

Mixtures of these and other conventional fillers can be used also.

These fillers may and usually do contain moisture, e.g., water of crystallization. Dehydrated fillers which can be obtained by calcining moisture containing fillers can be used in the present novel compositions. However uncalcined fillers are advantageously employed since they generally provide sealant compositions of improved resistance to acids.

The amount of filler used is not critical and can be varied over a broad range. The amount used will depend to a considerable extent upon the particular properties and characteristics desired in the final polyurethane product. Generally the filler is added in amounts of between about 25 and 150% by weight of the polyol component, corresponding to between about 10% and about 60% by weight of the total reaction mixture.

The present invention provides novel rapidly gelled, rapidly cured non-cellular polyurethane compositions eminently suited for in situ production of a polyurethane sealant, for example on ceramic materials. Use of the catalyst promoters in urethane-forming mixtures according to the invention permits reduction in the concentration of the costly organomercuric catalyst by about 10 weight percent or more without increasing the gel time or curing time of the urethane-forming mixture.

In addition to promoting the activity of the organomercuric polyurethane catalysts, the copper and silver compounds stabilize the activity of the mercury catalyst when solutions of the latter and the promoter compound in the polyol reactant are stored for extended periods at elevated temperatures in the presence of the filler. In addition to decreasing gel time of the organo-mercury salt catalyzed urethane-forming liquid reactions mass, the copper and silver promoter compounds accelerate curing of the gelled polyurethane as indicated by the increased hardness of promoter additive-containing polyurethanes in the examples below when compared to the hardness of the promoter-free polyurethane.

The more detailed practice of my invention will be illustrated by the following examples in which parts and percentages are by weight unless otherwise noted and temperatures are in degrees centigrade.

EXAMPLE 1

*Part A.*—Preparation of polyisocyanate (urethane prepolymer) component 69 parts of a mixture of about 80% 2,4-toluene diisocyanate and about 20% 2,6-toluene diisocyanate is heated to 50° C. Over a period of about 30 minutes, 31 parts of a 1,2-propylene glycol based 1,2-propylene oxide polyether (hydroxyl number 380, equivalent weight 147) is charged to the toluene diisocyanate with agitation, the mixture being maintained at about 70° C. during the addition. On completion of the addition the reaction mass is agitated at 70° C. for 2 hours and cooled to ambient temperature. The resultant isocyanate-terminated urethane prepolymer has the following characteristics:

Amine equivalent _____ 171
Free NCO _____percent__ 24.5
Unreacted toluene diisocyanate _____percent__ 25.4

*Part B.*—Preparation of polyether-polyol-filler component

A filler consisting of 83.5 parts uncalcined aluminum silicate ("Hydrite Flat D," Georgia Kaolin Co.), 0.7 part of a catalyst consisting of phenyl mercuric propionate and 1.0 part of a catalyst promoter consisting of a solution of copper naphthenate in mineral spirits containing 8% copper (Nuodex Corp.) are charged to 100 parts of a mixture of polyalkylene ether polyols (average equivalent weight 737, average functionality 2.3) consisting of:

49.5% of a glycerol based 1,2 propylene oxide polyether having a hydroxyl number of 83 and an equivalent weight of 675

16.5% of a glycerol based 1,2 propylene oxide polyether a hydroxyl number of 56 and an equivalent weight of 1000

25.5% of a 1,2 propylene glycol based 1,2 propylene oxide polyether having a hydroxyl number of 83 and an equivalent weight of 675

8.5% of a 1,2-propylene glycol based 1,2-propylene oxide polyether having a hydroxyl number of 56

The mixture is agitated in a high-shear mixer (Cowles Dissolver, Morehouse Cowles Co.) for 10 minutes. The resulting warm (60–70°) dispersion is cooled to ambient temperature (25–40°). To 150 parts of the cooled dispersion is added 20 parts of the urethane prepolymer component described above thereby providing a mixture having an isocyanate group to hydroxyl group ratio of 1.05:1.0. The resulting mixture is agitated for 30–60 seconds at about 25° and about 40 parts of the fluid mass is allowed to stand at about 38° C. The mass solidifies to a non-fluid gel in 5.5 minutes (as measured from commencement of agitation). After standing for 10 minutes (as measured from commencement of agitation) the noncellular urethane elastomer has a hardness of 59 as measured with a Shore A Durometer.

EXAMPLES 2–6

The procedure of Example 1 is repeated in preparing urethane elastomers in a number of experiments wherein the metal compounds and/or the amounts thereof added to the polyether polyol mixture of Part B are varied. The results of these experiments are reported in Table I.

TABLE I

| Example | Metallic Additive | Percentage of Metallic Additive Charged [1] | Gel Time (minutes) | Hardness |
|---|---|---|---|---|
| 2 | Phenylmercuric propionate | 0.7 | 6.5 | 52 |
| 3 | Phenylmercuric propionate<br>Silver acetate | 0.7<br>1.0 | 4.3 | 65 |
| 4 | Phenylmercuric propionate<br>A solution of cadmium octoate in mineral spirits (Shepard Chemical Co.) containing 20% cadmium. | 0.7<br>1.0 | 5.0 | 51 |
| 5 | A solution of cadmium octoate in mineral spirits (Shepard Chemical Co.) containing 20% cadmium. | 1.0 | >60 | |
| 6 | Phenylmercuric propionate<br>Stannous octoate | 0.7<br>1.0 | ([2]) | |
| 7 | Mercuric acetate | 0.7 | 6.0 | 30 |
| 8 | Mercuric acetate<br>A solution of copper naphthenate in mineral spirits containing 8% copper. | 0.7<br>1.0 | 6.50 | 28 |
| 9 | Mercuric acetate<br>Magnesium oxide [3] | 0.7<br>0.165 | 4.25 | 35 |
| 10 | Mercuric acetate<br>Magnesium oxide [3]<br>A solution of copper naphthenate containing 8% copper. | 0.7<br>0.165<br>1.0 | 5.0 | 30 |

[1] Based on the weight of the polyether-polyol mixture charged.
[2] No gelation after 20 minutes standing.
[3] Added to adjust the pH of the polyether polyol-filler component to 7.6 in accordance with U.S. Patent application Ser. No. 400,558.

In the above Examples 2 to 10, Example 2 illustrates the decreased activity of the organo-mercury catalyst in the absence of promoter additive and Example 5 illustrates the nonactivity of the promoter additive in the absence of organo-mercury catalyst. Example 6 illustrates the inoperability of a known urethane polymerization catalyst as a promoter additive in the present invention and Examples 7 to 10 illustrate the inoperability of a non-organic mercuric salt as a reaction catalyst in the present invention.

EXAMPLES 11–14

The procedure of Examples 1, 2, 4, and 6 is repeated in Examples 11–14 omitting the addition of aluminum silicate filler and employing different amounts of the metallic additives. These are tabulated in Table II.

TABLE II

| Example | Metallic Additive | Percentage of Metallic Additive Charged [1] | Gel Time (minutes) |
|---|---|---|---|
| 11 | Phenylmercuric propionate<br>A solution of cupric naphthenate in mineral spirits containing 8% copper. | 0.4<br>0.5 | 5.0 |
| 12 | Phenylmercuric propionate | 0.4 | 5.5 |
| 13 | Phenylmercuric propionate<br>A solution of cadmium octoate in mineral spirits containing 20% cadmium. | 0.4<br>0.5 | 4.75 |
| 14 | Phenylmercuric propionate<br>Stannous octoate | 0.4<br>0.5 | >10 |

[1] Based on the weight of the polyether-polyol mixture charged.

The above Examples 11 and 13 illustrate the activity of the catalyst-promoter combination in the absence of filler and employing smaller amounts of the combination catalyst-promoter of this invention. Example 12 illustrates the decreased activity of the organo-mercury compound in the absence of promoter additive and Example 14 illustrates the inoperability of a known urethane catalyst as a catalyst promoter according to the present invention.

EXAMPLES 15–17

In several experiments the procedures of Examples 1, 2 and 3 are repeated substantially as described except that the polyol-filler dispersion containing dissolved organo-mercuric salt catalyst and catalyst promoter is stored for two weeks at 55° before being reacted with the polyisocyanate component. The results of these experiments are tabulated in Table III. These experiments demonstrate the beneficial effects on the storage stability of polyol-catalyst solutions when the latter are stored in the presence of promoters of the invention.

TABLE III

| Example | Metallic Additive | Percentage of Metallic Additive Charged [1] | From Examples 1, 2 and 3 using freshly prepared polyol component | | Using polyol component stored for two weeks at 55° C. | |
|---|---|---|---|---|---|---|
| | | | Gel Time (minutes) | Hardness | Gel Time (minutes) | Hardness |
| 15 | Phenylmercuric propionate<br>A solution of copper naphthenate in mineral spirits containing 8% copper. | 0.7<br>1.0 | 5.5 | 59 | 5.5 | 50 |
| 16 | Phenylmercuric propionate | 0.7 | 6.5 | 52 | 8.5 | 10 |
| 17 | Phenylmercuric propionate<br>Silver acetate | 0.7<br>1.0 | 4.3 | 65 | 4.5 | 55 |

[1] Based on the weight of the polyether-polyol mixture charged.

I claim:
1. A composition of matter adapted for admixture with an organic isocyanate to produce a rapidly gelled noncellular polyurethane composition comprising an organic polyol, an organo mercuric salt catalyst selected from the group consisting of organo-mercuric carboxylates, phenyl mercuric nitrate and mixtures thereof and a promoter compound, characterized by having a solubility of at least 0.1%, by weight, in either ethanol or dioxane at ambient temperature, of a metal selected from the group consisting of copper, silver and cadmium, said catalyst and promoter compound being dissolved in said polyol and devoid of ionizable halogen.
2. A composition as defined in claim 1 wherein said catalyst is an aromatic mercury salt.
3. A composition as defined in claim 2 wherein said promoter compound is a metal salt of an organic carboxylic acid.
4. A composition as defined in claim 2 wherein said aromatic mercury salt is phenyl mercuric propionate.
5. A composition as defined in claim 3 wherein said promoter compound is a metal salt of an organic carboxylic acid selected from the group consisting of acetate, octoate and naphthenate.
6. A composition as defined in claim 1 wherein the organo-mercury catalyst is present in an amount ranging from about 0.01% to about 5% by weight of polyol and said promoter compound is present in an amount ranging from about 0.01% to about 2% by weight of polyol.
7. A composition as defined in claim 1 containing an insert filler.
8. A composition as defined in claim 1 wherein said organo-mercuric salt catalyst is an organo-mercuric carboxylate.
9. A composition as defined in claim 1 wherein said promoter compound is a member selected from the group consisting of organic carboxylates, nitrates, borates, cupric perchlorate, silver pentachlorophenate and cadmium diethyl dithiocarbamate.
10. A process for producing a rapidly gelled, noncellular polyurethane composition comprising admixing an organic polyisocyanate with a composition of matter comprising an organic polyol, an organo-mercuric salt catalyst selected from the group consisting of organo-mercuric carboxylates, phenyl mercuric nitrate and mixtures thereof and a promoter compound, characterized by having a solubiilty of at least 0.1%, by weight, in either ethanol or dioxane at ambient temperature, of a metal selected from the group consisting of copper, silver and cadmium, said catalyst and promoter being soluble in the reaction mixture and devoid of ionizable halogen.
11. The process of claim 10 wherein the organo-mercury catalyst is present in an amount ranging from about 0.01% to about 5% by weight of polyol and said promoter compound is present in an amount ranging from about 0.07% to about 2% by weight of polyol.
12. The process of claim 11 wherein the proportions of the organic polyisocyanate to polyol are such as provide an NCO/OH ratio in the range of about 0.9:1 to about 1.4:1.
13. The process of claim 12 wherein said organo-mercury catalyst is phenyl mercuric propionate and said promoter compound is a metal salt of an organic carboxylic acid selected from the group consisting of acetate octoate and naphthenate.
14. The process of claim 10 wherein said composition of matter contains an inert filler.
15. The process of claim 10 wherein said organo-mercuric salt catalyst is an organo-mercuric carboxylate.
16. The process of claim 10 wherein said promoter compound is a member selected from the group consisting of organic carboxylates, nitrates, borates, cupric perchlorate, silver pentachlorophenate and cadmium diethyl dithiocarbamate.

References Cited

UNITED STATES PATENTS

| 3,267,050 | 8/1966 | Kuryla et al. | 270—77.5 X |
| 3,201,136 | 8/1965 | Harrison et al. | 260—77.5 X |
| 3,119,792 | 1/1964 | Schultheis et al. | 260—75 X |

FOREIGN PATENTS

| 1,025,088 | 4/1966 | Great Britain. |
| 909,358 | 10/1962 | Great Britain. |
| 720,528 | 10/1965 | Canada. |

DONALD E. CZAJA, Primary Examiner

C. WARREN IVY, Assistant Examiner

U.S. Cl. X.R.

252—428, 431; 260—9, 37, 75, 77.5

UNITED STATES PATENT OFFICE
CERTIFICATE OF CORRECTION

Patent No. 3,492,255    Dated January 27, 1970

Inventor(s) David S. Cobbledick

It is certified that error appears in the above-identified patent and that said Letters Patent are hereby corrected as shown below:

Column 1, line 34, "substantally" should read --substantially--

Column 2, line 34, "ure" should read --ure- -- line 60, "salogen" should read --halogen--

Column 4, line 72, "boronitrifluoride" should read --borontrifluoride--

Column 9, line 4, "organo mercuric" should read --organo-mercuric-- line 32, "insert" should read --inert--

Column 10, line 9, "0.07%" should read --0.01%--

Signed and sealed this 11th day of May 1971.

(SEAL)
Attest:

EDWARD M. FLETCHER, JR.
Attesting Officer

WILLIAM E. SCHUYLER, JR.
Commissioner of Patents